US012535064B2

(12) United States Patent
Duan

(10) Patent No.: US 12,535,064 B2
(45) Date of Patent: Jan. 27, 2026

(54) WATER-PUMPING DEVICE AND HAIRDRESSING DEVICE

(71) Applicant: Shenzhen Yangwo Electronic Co., Ltd., Shenzhen (CN)

(72) Inventor: Dejin Duan, Shenzhen (CN)

(73) Assignee: SHENZHEN YANGWO ELECTRONIC CO., LTD., Shenzhen (CN)

( * ) Notice: Subject to any disclaimer, the term of this patent is extended or adjusted under 35 U.S.C. 154(b) by 444 days.

(21) Appl. No.: 18/049,636

(22) Filed: Oct. 26, 2022

(65) Prior Publication Data

US 2023/0078299 A1 Mar. 16, 2023

Related U.S. Application Data

(63) Continuation of application No. PCT/CN2020/094036, filed on Jun. 2, 2020.

(30) Foreign Application Priority Data

Dec. 26, 2019 (CN) ......................... 201911371472.7
Jan. 10, 2020 (CN) ......................... 202020066611.7

(51) Int. Cl.
*F04B 43/12* (2006.01)
*A45D 2/00* (2006.01)
(Continued)

(52) U.S. Cl.
CPC .......... *F04B 43/1238* (2013.01); *A45D 2/001* (2013.01); *A45D 2/36* (2013.01);
(Continued)

(58) Field of Classification Search
CPC .. F04B 43/1238; F04B 23/025; F04B 43/123; A45D 2/001; A45D 2/36;
(Continued)

(56) References Cited

U.S. PATENT DOCUMENTS 1,703,361 A * 2/1929 Pohl .................... F04B 43/1276 137/565.17
2,885,966 A * 5/1959 Ford ....................... F04B 43/14 417/307
(Continued)

FOREIGN PATENT DOCUMENTS

CN 103225593 A 7/2013
CN 207178163 U 4/2018
(Continued)

OTHER PUBLICATIONS

Raw Machine Translation of "CN207803722", "Automatic go out hair straightening comb of steam", Chen et al. , 2018 (Year : 2018).*

*Primary Examiner* — Charles G Freay
*Assistant Examiner* — Lilya Pekarskaya
(74) *Attorney, Agent, or Firm* — Andrew C. Cheng

(57) ABSTRACT

The present invention provides a water-pumping device and a hairdressing device. The water-pumping device is connected to a liquid storage device to deliver liquid in the liquid storage device, and includes a chamber for containing the liquid and a squeezing device. Two ends of the chamber are communicated with a first water delivery channel and a second water delivery channel respectively, the first water delivery channel is connected to the liquid storage device, and a wall surface of the chamber is at least partially made of a deformable material, and the squeezing device periodically squeezes the deformable material from one end of the chamber to the other end thereof to cause the first water delivery channel to pump water and the second water delivery channel to deliver water. No hose is provided in the chamber so that the number of components is reduced and the overall structure is simplified.

11 Claims, 6 Drawing Sheets

(51) Int. Cl.

| | |
|---|---|
| *A45D 2/36* | (2006.01) |
| *B05B 9/04* | (2006.01) |
| *B05B 15/30* | (2018.01) |
| *F04B 23/02* | (2006.01) |

(52) U.S. Cl.
CPC ........ *A45D 2200/056* (2013.01); *B05B 9/042* (2013.01); *B05B 15/30* (2018.02); *F04B 23/025* (2013.01); *F04B 43/123* (2013.01)

(58) Field of Classification Search
CPC ........ A45D 2200/056; A45D 2001/008; A45D 1/00; B05B 9/0861; B05B 15/30; B05B 9/042; F04C 5/00; A61B 2018/00011; A61B 2018/00476; A61N 5/0617

See application file for complete search history.

(56) References Cited

U.S. PATENT DOCUMENTS

| | | | | |
|---|---|---|---|---|
| 3,687,580 | A * | 8/1972 | Griffiths .............. | F04B 43/0072 418/45 |
| 4,142,845 | A | 3/1979 | Lepp et al. | |
| 6,024,545 | A * | 2/2000 | Morioka ............... | F04B 43/123 417/478 |
| 7,044,137 | B2 * | 5/2006 | Glucksman ............ | A45D 24/28 132/114 |
| 2013/0195630 | A1 * | 8/2013 | Sato ........................ | F04B 43/08 415/153.1 |
| 2016/0003231 | A1 * | 1/2016 | Brück ................. | F04B 43/1238 417/476 |
| 2018/0216615 | A1 * | 8/2018 | Hodgson ............... | F01N 3/2066 |

FOREIGN PATENT DOCUMENTS

| | | | |
|---|---|---|---|
| CN | 207803722 | U * | 9/2018 |
| CN | 208919387 | U | 5/2019 |
| CN | 111140477 | A | 5/2020 |

* cited by examiner

WATER-PUMPING DEVICE AND HAIRDRESSING DEVICE

TECHNICAL FIELD OF THE INVENTION

The present invention relates to the technical field of hairdressing devices and in particular to a water-pumping device and a hairdressing device.

BACKGROUND OF THE INVENTION

With the improvement of people's living standards and the pursuit of hairdressing art, hairdressing devices are increasingly widely used. For example, for a hair straightener, in order to reduce damage to hair during hair straightening, a steam hair straightener emerges on the market that is connected to a water delivery mechanism and evaporates water into steam during hair straightening to moisten the hair. However, the existing water delivery mechanism needs to be additionally provided with a hose as a water delivery pipe to deliver water. As a result, there are too many components and the structure is complex.

SUMMARY OF THE INVENTION

In order to solve the problem that the existing water delivery mechanism has too many components and a complex structure, the present invention provides a water-pumping device and a hairdressing device.

In order to solve the above problem, the present invention provides a water-pumping device connected to a liquid storage device to deliver a liquid in the liquid storage device; the water-pumping device includes a chamber for containing the liquid and a squeezing device; two opposite ends of the chamber are communicated with a first water delivery channel and a second water delivery channel respectively; the first water delivery channel is connected to the liquid storage device; a wall surface of the chamber is at least partially made of a deformable material, and the squeezing device periodically squeezes a deformable wall surface from one end of the chamber to the other end thereof to make the first water delivery channel pump water and the second water delivery channel deliver water.

The present invention also provides a hairdressing device that includes a water-pumping device and a liquid storage device which are connected; the water-pumping device includes a chamber for containing a liquid and a squeezing device; two opposite ends of the chamber are communicated with a first water delivery channel and a second water delivery channel respectively; the first water delivery channel is connected to the liquid storage device, and a wall surface of the chamber is at least partially made of a deformable material; the squeezing device periodically squeezes the deformable material from one end of the chamber to the other end thereof to cause the first water delivery channel to pump water and the second water delivery channel to deliver water.

Preferably, the liquid storage device includes a tank, a water guide pipe, and a first water suction member; one end of the water guide pipe passes through the water tank to be communicated with the outside, and the opposite end thereof is connected to the first water suction member; one end of the first water suction member is disposed on the water guide pipe and the opposite end thereof extends in the tank.

Compared with the prior art, the water-pumping device and the hairdressing device according to the present invention have the benefits as follows.

The water-pumping device according to the present invention may be connected to the liquid storage device to deliver the liquid in the liquid storage device; the water-pumping device includes a chamber for containing the liquid and a squeezing device; two opposite ends of the chamber are communicated with a first water delivery channel and a second water delivery channel respectively; the first water delivery channel is connected to the liquid storage device; the wall surface of the chamber is at least partially made of a deformable material, and the squeezing device periodically squeezes the deformable material from one end of the chamber to the other end thereof to cause the first water delivery channel to pump water and the second water delivery channel to deliver water; since the chamber does not need to be additionally provided with a hose to contain the liquid, the number of components is reduced, the overall structure is simplified, and the water-pumping device is simpler in structure.

The hairdressing device according to the present invention includes the above water-pumping device and the liquid storage device which are connected; the hairdressing device has the same benefits as the above water-pumping device, which are not repeated here.

For the liquid storage device, the liquid in the tank can be sucked through the first water suction member; the first water suction member extends to an end, away from a water outlet, in the tank, and can suck the liquid, away from the water outlet, in the tank when there is little liquid in the tank; in addition, an end, away from the water outlet, of the first water suction member can move at the end, away from the water outlet, in the tank, so that the first water suction member can suck the liquid when the tank is inclined and discharge the liquid to the outside, so that the liquid utilization rate is increased, and the situation that the first water suction member cannot suck the liquid when the tank is inclined is avoided.

DETAILED DESCRIPTION OF THE INVENTION

In order to make the objects, technical solutions and advantages of the present invention clearer, the present invention is further described in detail below with reference to the accompanying drawings and embodiments. It should be understood that the specific embodiments described herein are only intended to explain the present invention instead of limiting the present invention.

Figure 1:
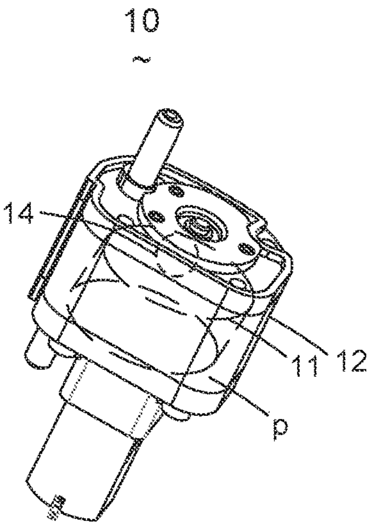
FIG. 1 is a structural diagram I of a water-pumping device according to a first embodiment of the present invention.

With reference to FIG. 1, a first embodiment of the present invention provides a water-pumping device 10 for being connected to a liquid storage device to deliver a liquid in the liquid storage device. The water-pumping device 10 includes a chamber p for containing the liquid and a squeezing device 14.

Specifically, the chamber p is defined by a hard wall surface and a deformable wall surface. In some embodiments, the chamber p may be entirely defined by the deformable wall surface.

Figure 2:
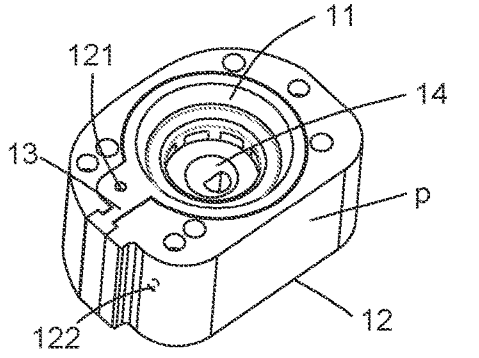
FIG. 2 is a partial structural diagram of the water-pumping device according to the first embodiment of the present invention.
Figure 3:
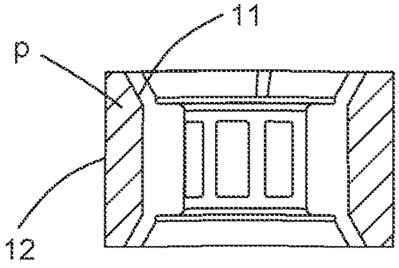
FIG. 3 is a schematic sectional view of a chamber of the water-pumping device according to the first embodiment of the present invention.

With reference to FIGS. 1-3, the water-pumping device 10 comprises a flexible pump core 11, an outer bracket 12 and a baffle 13; the outer bracket 12 is sleeved on the outer peripheral side of the flexible pump core 11; the baffle 13 is disposed between the flexible pump core 11 and the outer bracket 12, and extends from one of the flexible pump core 11 and the outer bracket 12 and is positioned on the other of the flexible pump core 11 and the outer bracket 12. FIG. 3 shows a sectional view of the chamber p. The flexible pump core 11 is made of a deformable material.

Figure 4:
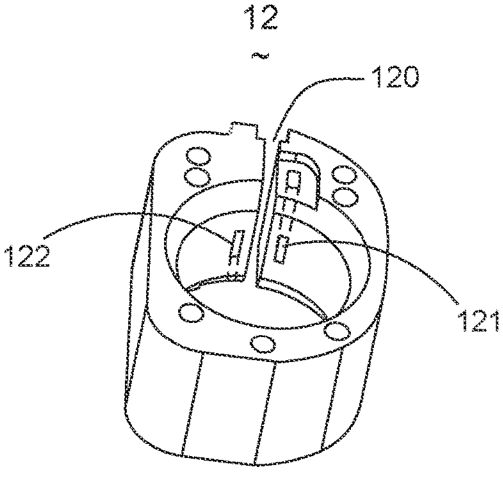
FIG. 4 is a structural diagram of an outer bracket of the water-pumping device according to the first embodiment of the present invention.
Figure 5:
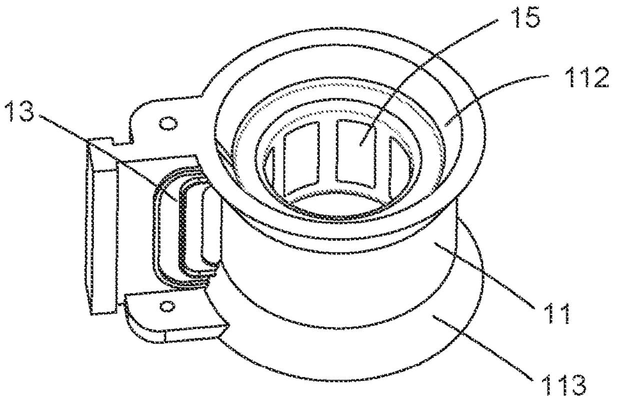
FIG. 5 is a structural diagram of a flexible pump core of the water-pumping device according to the first embodiment of the present invention.

Specifically, with reference to FIGS. 2, 4 and 5, the flexible pump core 11 is ring-shaped (as shown in FIG. 5). The outer bracket 12 is ring-shaped with a notch 120 (as shown in FIG. 4). The baffle 13 is fixed to the flexible pump core 11, and the end of the baffle 13 away from the flexible pump core 11 is clamped into the notch 120 of the outer bracket 12. In some embodiments, the baffle 13 may be fixed to the outer bracket 12, and the end of the baffle 13 away from the outer bracket 12 is tightly attached to the flexible pump core 11, as long as the baffle 13 is disposed between the flexible pump core 11 and the outer bracket 12 and separates a first water delivery channel 121 and a second water delivery channel 122.

Specifically, the baffle 13 is made of a deformable material. The thickness of one side of the baffle 13 close to the flexible pump core 11 is less than that of the side thereof away from the flexible pump core 11. When the squeezing device 14 squeezes to a position of the flexible pump core 11 corresponding to the baffle 13, the side of the baffle 13 close to the flexible pump core 11 moves to the side away from the flexible pump core 11 to make way for the squeezing device 14 and thus the squeezing device 14 continues to move.

Specifically, the chamber p is ring-shaped with an opening. The baffle 13 is located at the opening of the chamber p. The squeezing device 14 is an eccentric wheel 141. In some embodiments, the squeezing device 14 may be a circular roller or others. The chamber p may be of other shapes, such as fan-shaped, an elliptic-shaped with an opening, or linear-shaped, as long as two opposite ends of the chamber p are communicated with the first water delivery channel 121 and the second water delivery channel 122 respectively. The squeezing device 13 periodically squeezes the deformable material from one end of the chamber p to the other end thereof to cause the first water delivery channel 121 to pump water and the second water delivery channel 122 to deliver water.

Optionally, the flexible pump core 11 may be entirely made of a deformable material. By changing the thickness of the deformable material, part of the flexible pump core 11 can play a role of supporting. For example, the flexible pump core 11 has a thicker upper surface and a thicker lower surface, which may support the flexible pump core 11 and thus the flexible pump core 11 has a certain shape. The flexible pump core 11 has a relatively thin middle portion which may be subjected to a certain deformation by squeezing and may basically return to its original shape when the squeezing force is removed. Preferably, the flexible pump core 11 is made of rubber. As such, the flexible pump core 11 is subjected to certain deformation when being squeezed and the chamber p has a good sealing property to prevent water leakage. In some embodiments, the flexible pump core 11 may also be made of other deformable materials, such as silica gel, as long as the flexible pump core 11 may be subjected to certain deformation when being squeezed and the chamber p has a good sealing property.

It may be understood that the interior of the flexible pump core 11 may be partially made of a deformable material that can be deformed by squeezing or entirely made of a deformable material that can be deformed by squeezing, as long as the portion, in contact with the squeezing device 14, of the flexible pump core 11 is made of a deformable material, that can be deformed by squeezing.

Optionally, the outer bracket 12 may be entirely made of a hard material, partially made of a hard material and partially made of a deformable material, or entirely made of a deformable material with a low deformation degree, as long as the outer bracket 12 plays a role of supporting when the outer bracket 12 is sleeved on the outer peripheral side of the flexible pump core 11, and the outer bracket 12 and the flexible pump core 11 together define the chamber p.

With continued reference to FIGS. 2 and 4, the first water delivery channel 121 and the second water delivery channel 122 are disposed on the outer bracket 12, and the two opposite ends of the chamber p are communicated with the first water delivery channel 121 and the second water delivery channel 122 respectively. The first water delivery channel 121 is connected to the liquid storage device. A wall surface of the chamber p is at least partially made of a deformable material. The squeezing device 14 periodically squeezes the deformable material from one end of the chamber p to the other end thereof to cause the first water delivery channel 121 to pump water and the second water delivery channel 122 to deliver water.

Figure 6:
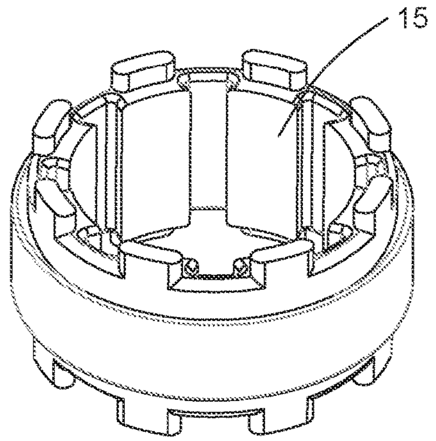
FIG. 6 is a diagram I showing a movement state of a squeezing device of the water-pumping device according to the first embodiment of the present invention.

With reference to FIGS. 2, 5 and 6, the water-pumping device 10 further comprises an inner bracket 15 (as shown in FIG. 6). The inner bracket 15 is fixed inside the flexible pump core 11 (as shown in FIG. 5) and is made of hard material. The squeezing device 14 drives the inner bracket 15 to periodically squeeze the flexible pump core 11 from one end of the chamber p to the other end thereof to cause the first water delivery channel 121 to pump water and the second water delivery channel 122 to deliver water. During moving, the squeezing device 14 is not in direct contact with the flexible pump core 11, instead, the squeezing device 14 squeezes the flexible pump core 11 by driving the inner bracket 15, so that the wear of the flexible pump core 11 can be reduced. In addition, as the flexible pump core 11 is squeezed by the inner bracket 15, the squeezing contact surface is increased. As such, the efficiency of squeezing the flexible pump core by the squeezing device 14 can be improved, the load can be reduced, and thus the liquid is delivered more uniformly.

Figure 7:
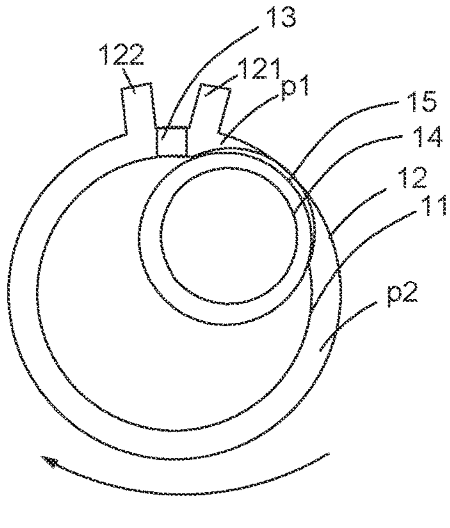
FIG. 7 is a diagram II showing the movement state of the squeezing device of the water-pumping device according to the first embodiment of the present invention.
Figure 8:
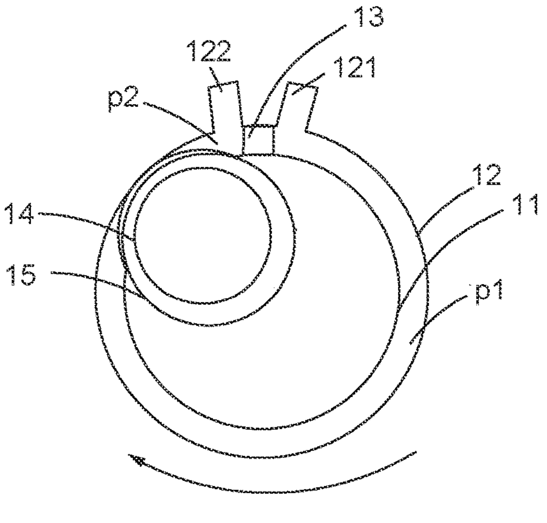
FIG. 8 is a structural diagram of an inner bracket of the water-pumping device according to the first embodiment of the present invention.

With reference to FIGS. 7 and 8, the arrow indicates a movement direction of the squeezing device 14. When the water-pumping device 10 is in a working state, the squeezing device 14 drives the inner bracket 15 to squeeze the flexible pump core 11 from one end of the chamber p to the other end thereof so as to divide the chamber p into a water inlet chamber p1 and a water outlet chamber p2. The water inlet chamber p1 is located on a back side in the movement direction of the squeezing device 14 and the water outlet chamber p2 is located on a front side in the movement direction of the squeezing device 14. It may be understood that when the squeezing device 14 continues to move from the state shown in FIG. 7, the water inlet chamber p1 will generate negative pressure and the liquid is pumped into the water inlet chamber p1 from the first water delivery channel 121. At the same time, the water outlet chamber p2 will generate positive pressure and the liquid in the water outlet chamber p2 is discharged from the second water delivery channel 122. When the squeezing device 14 moves to the state shown in FIG. 8, the liquid in the water outlet chamber p2 is discharged. There is no hose structure between the first water delivery channel 121 and the second water delivery channel 122. Since the chamber does not need to be additionally provided with a hose to contain the liquid, the number of components is reduced and the overall structure is simplified. Thus, the water-pumping device 10 is simpler in structure.

Figure 9:
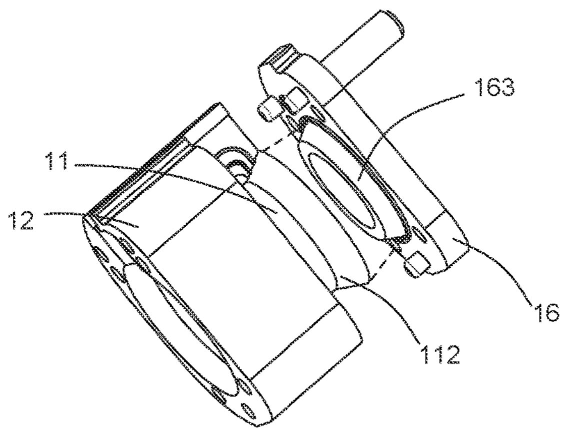
FIG. 9 is an exemplary diagram I showing the connection of the outer bracket and an upper cover of the water-pumping device according to the first embodiment of the present invention.
Figure 10:
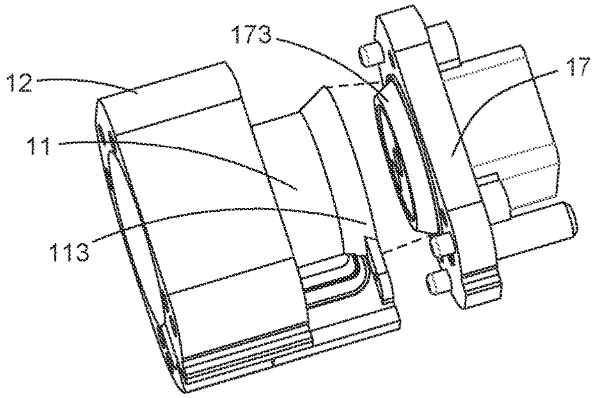
FIG. 10 is an exemplary diagram I showing the connection of the outer bracket and a lower cover of the water-pumping device according to the first embodiment of the present invention.

With reference to FIGS. 5, 9 and 10, the water-pumping device 10 further includes an upper cover 16 with a first convex member 163 (as shown in FIG. 9) and a lower cover 17 with a second convex member 173 (as shown in FIG. 10). The flexible pump core 11 is provided with a first concave member 112 and a second concave member 113 (as shown in FIG. 5). The first convex member 163 matches the first concave member 112 in structure and the second convex member 173 matches the second concave member 113 in structure. When the upper cover 16 is connected to the outer bracket 12, the first convex member 163 squeezes the first concave member 112, so that the first concave member 112 is tightly attached to the outer bracket 12. When the lower cover 17 is connected to the outer bracket 12, the second convex member 173 squeezes the second concave member 113, so that the second concave member 113 is tightly attached to the outer bracket 12. As such, the chamber p has a good sealing property to prevent liquid leakage.

Figure 11:
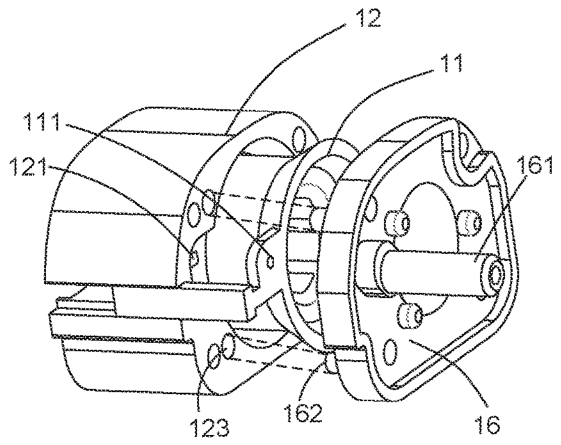
FIG. 11 is an exemplary diagram II showing the connection of the outer bracket and the upper cover of the water-pumping device according to the first embodiment of the present invention.
Figure 12:
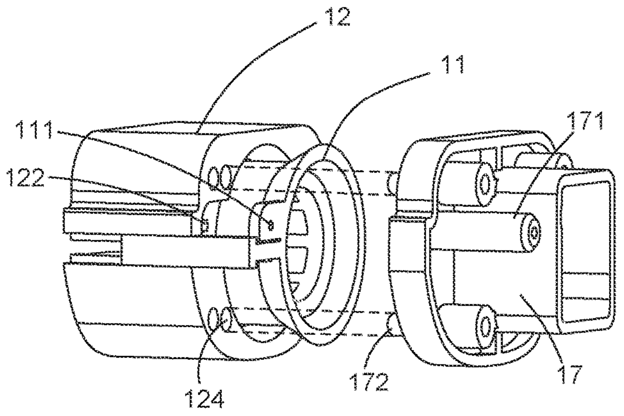
FIG. 12 is an exemplary diagram II showing the connection of the outer bracket and the lower cover of the water-pumping device according to the first embodiment of the present invention.

With reference to FIGS. 11 and 12, a first water delivery pipe 161 is disposed on the upper cover 16 and a second water delivery pipe 171 is disposed on the lower cover 17. The flexible pump core 11 is provided with water delivery holes 111 in positions corresponding to the first water delivery channel 121 and the second water delivery channel 122.

A first groove 123 and a first boss 162 that match each other are disposed on surfaces, facing each other, of the outer bracket 12 and the upper cover 16 respectively (as shown in FIG. 11). When the first boss 162 is inserted into the first groove 123, the first water delivery pipe 161 is correspondingly communicated with the first water delivery channel 121 through the water delivery hole 111. A second groove 124 and a second boss 172 that match each other are disposed on surfaces, facing each other, of the outer bracket 12 and the lower cover 17 respectively (as shown in FIG. 12). When the second boss 172 is inserted into the second groove 124, the second water delivery pipe 171 is correspondingly communicated with the second water delivery channel 122 through the water delivery hole 111.

Optionally, one of the first groove 123 and the first boss 162 is disposed on the outer bracket 12 and the other is disposed on the upper cover 16. One of the second groove 124 and the second boss 172 is disposed on the outer bracket 12 and the other is disposed on the lower cover 17.

It may be understood that by butting the first water delivery pipe 161 and the first water delivery channel 121, and butting the second water delivery pipe 171 and the second water delivery channel 122, an outlet and an inlet of the liquid are exposed. Therefore, the device may be used by directly connecting water pipes with the first water delivery pipe 161 and the second water delivery pipe 171 and it is convenient to pump water into the water-pumping device 10 from the liquid storage device and introduce the liquid into other devices after the liquid is delivered out of the water-pumping device 10. In addition, as the first groove 123 and the first boss 162 as well as the second groove 124 and the second boss 172 are disposed, when the outer bracket 12 is connected to the upper cover 16 and the lower cover 17, it is convenient to accurately butt the first water delivery pipe 161 and the first water delivery channel 121 and butt the second water delivery pipe 171 and the second water delivery channel 122, thereby preventing water leakage caused by inaccurate butting. In addition, the rigidity of the outer bracket 12 can be limited, and shaking due to a squeezing force of the squeezing device 14 and the outer bracket 12 is avoided during working, thereby improving the stability of delivering the liquid. The fixing of the outer bracket 12 ensures the forming of the flexible pump core 11, thereby improving the liquid delivery effect.

Figure 13:
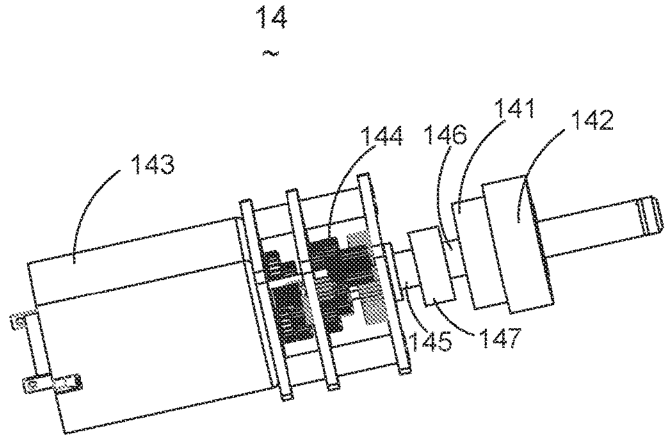
FIG. 13 is a structural diagram of the squeezing device of the water-pumping device according to the first embodiment of the present invention.

With reference to FIGS. 2 and 13, the squeezing device 14 includes an eccentric wheel 141, a swing bearing 142, a motor 143 and a reduction gear assembly 144. The motor 143 and the eccentric wheel 141 are connected through the reduction gear assembly 144. When rotating, the motor 143 decelerates through the reduction gear assembly 144, so that the movement speed of the eccentric wheel 141 matches the optimal water outlet frequency. The swing bearing 142 is disposed on the eccentric wheel 141, and is tightly attached to the deformable wall surface. The motor 143 rotates to drive, through the reduction gear assembly 144, the eccentric wheel 141 to move, and thus drive the swing bearing 142 to periodically squeeze the deformable wall surface from one end of the chamber p to the other end thereof to make the first water delivery channel 121 pump water and the second water delivery channel 122 deliver water. Since the swing bearing 142 is tightly attached to the deformable wall surface, the swing bearing 142 is driven through the eccentric wheel 141 during squeezing and there is less friction between the swing bearing 142 and the deformable wall surface, which can reduce the wear of the deformable material and prolongs the service life of the water-pumping device 10.

With continued reference to FIG. 13, the squeezing device 14 further comprises a driving shaft 145, a driven shaft 146 and a sealing member 147. The driving shaft 145 is connected to the reduction gear assembly 144, the driven shaft 146 is connected to the driving shaft 145 and the eccentric wheel 141, and the sealing member 147 is disposed between the driving shaft 145 and the driven shaft 146. As a result, the eccentric wheel 141 may be separated from the reduction gear assembly 144 without affecting the movement of the eccentric wheel 141 to achieve the effect of water and electricity separation and improve the use safety of the water-pumping device 10.

Figure 14:
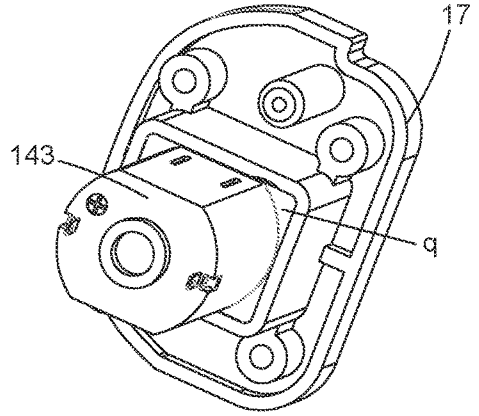
FIG. 14 is an exemplary diagram showing the lower cover, having a motor accommodated therein, of the squeezing device of the water-pumping device according to the first embodiment of the present invention.

With reference to FIG. 14, an accommodating groove q is formed in the lower cover 17 and the motor 143 is accommodated in this accommodating groove q. As such, a fixing effect is achieved when the motor 143 rotates, and thus the liquid return caused by shaking of the motor 143 is avoided.

As a variant embodiment, the first water delivery channel 121 and the second water delivery channel 122 may be disposed on the flexible pump core 11, or one of the first water delivery channel 121 and the second water delivery channel 122 is disposed on the flexible pump core 11 and the other is disposed on the outer bracket 12, as long as the first water delivery channel 121 is connected to the liquid storage device and the two opposite ends of the chamber p are communicated with the first water delivery channel 121 and the second water delivery channel 122 respectively.

In some variant embodiments, the flexible pump core 11 may be provided with no water delivery hole 111. The first water delivery pipe 161 directly corresponds to the first water delivery channel 121 and the second water delivery pipe 171 directly corresponds to the second water delivery channel 122 as long as the first water delivery pipe 161 is correspondingly communicated with the first water delivery channel 121 when the first boss 162 is inserted into the first groove 123, and the second water delivery pipe 171 is correspondingly communicated with the second water delivery channel 122 when the second boss 172 is inserted into the second groove 124.

In some variant embodiments, the first boss 162 may also be disposed on an edge of the surface, facing the outer bracket 12, of the upper cover 16, and at the same time, the first groove 123 is formed in a corresponding position of the surface, facing the upper cover 16, of the outer bracket 12, so that when the upper cover 16 is connected to the outer bracket 12, the first boss 162 is just inserted into the first groove 123; or the first groove 123 is formed in a corresponding position of the periphery of the outer bracket 12, so that when the upper cover 16 is connected to the outer bracket 12, the first boss 162 is just clamped in the first groove 123. For the same reason, the second boss 172 may also be disposed on an edge of the surface, facing the outer bracket 12, of the lower cover 17, and at the same time, the second groove 124 is formed in a corresponding position of the surface, facing the lower cover 17, of the outer bracket 12, so that when the lower cover 17 is connected to the outer bracket 12, the second boss 172 is just inserted into the second groove 124; or the second groove 124 is formed in a corresponding position of the periphery of the outer bracket 12, so that when the lower cover 17 is connected to the outer bracket 12, the second boss 172 is just clamped in the second groove 124.

Optionally, the outer bracket 12 is connected to the upper cover 16 and the lower cover 17 by any of magnetic attraction, clamping and threaded connection. The connection mode of the outer bracket 12 with the upper cover 16 and the lower cover 17 is not limited as long as the outer bracket 12 may be tightly connected to the upper cover 16 and the lower cover 17 and the disassembly is convenient for facilitating cleaning and maintenance of the internal structure of the water-pumping device 10.

Figure 15:
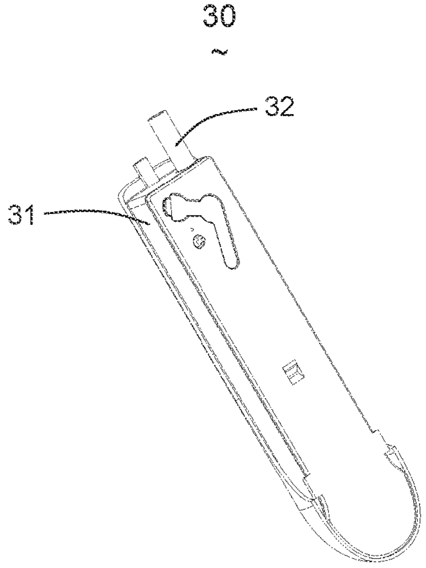
FIG. 15 is an overall structural diagram of a liquid storage device according to a second embodiment of the present invention.
Figure 16:
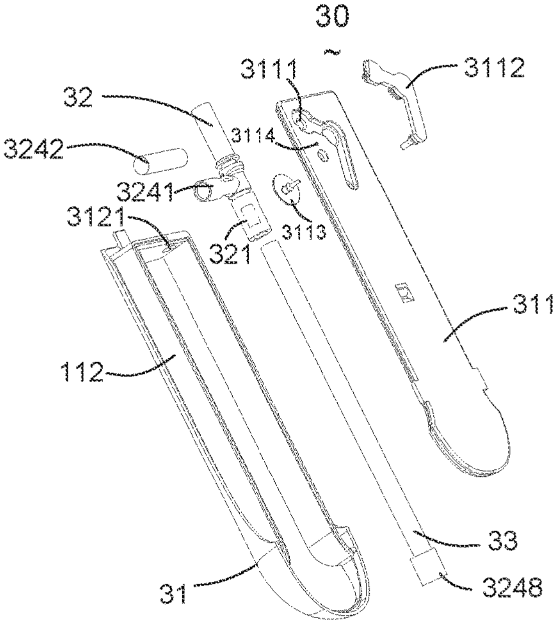
FIG. 16 is an exploded structural diagram of the liquid storage device according to the second embodiment of the present invention.

With reference to FIGS. 15 and 16, a second embodiment of the present invention provides a liquid storage device 30 for supplying a liquid to an external device (such as a hairdressing device, a humidifier, and a face-cleaning device). The liquid storage device 30 includes a tank 31, a water guide pipe 32, and a first water suction member 33. A portion of the water guide pipe 32 and the first water suction member 33 are embedded into the tank 31, and the first water suction member 33 is communicated with the water guide pipe 32. As an embodiment, a communication mode of the first water suction member 33 and the water guide pipe 32 is specifically that one end of the first water suction member 33 is placed in the water guide pipe 32 and an opposite end of the first water suction member 33 extends to a wall surface, away from the water guide pipe 32, in the tank 31. The water guide pipe 32 runs through the tank 31 and is partially exposed to the tank 31. The water guide pipe 32 is configured to output the liquid to an external device, the tank 31 is configured to store the liquid, and the first water suction member 33 is configured to suck the liquid in the tank 31 and discharge the liquid to the outside through the water guide pipe 32.

It may be understood that the water guide pipe 32 may be connected to a water pump, through which the liquid in the tank 31 is discharged. For example, in a steam hair-straightening device, the liquid in the tank 31 is pumped out through a peristaltic pump.

It may be understood that the water guide pipe 32 is in interference fit with the first water suction member 33, so that a connection position of the water guide pipe 32 and the first water suction member 33 is sealed, thereby avoiding the failure of pumping water due to loose connection and improving the stability of pumping water.

Specifically, the tank 31 includes a first housing 311 and a second housing 312. The first housing 311 is buckled on the second housing 312. An accommodating space for liquid storage is defined between the first housing 311 and the second housing 312, and the first water suction member 33 and a portion of the water guide pipe 32 are disposed therein. A water outlet 3121 is formed on the second housing 312. The water guide pipe 32 runs through the second housing 312 through the water outlet 3121 to output the liquid in the tank 31 to an external device. Particularly, after the first water suction member 33 sucks the liquid, an end, away from the water guide pipe 32, of the first water suction member 33 has an increased weight due to liquid suction and may move in the tank 31. When there is little liquid in the tank 31, the end, away from the water guide pipe 32, of the first water suction member 33 may move to a liquid position to suck the liquid and then discharge the liquid to the water guide pipe 32.

It may be understood that the water guide pipe 32 and the first water suction member 33 are disposed in the accommodating space of the tank 31, and the first water suction member 33 is in contact with the liquid in the tank 31, so that the liquid in the tank 31 may enter the external device through the water guide pipe 32. The first water suction member 33 sucks the liquid in the tank 31 and the external device draws the liquid from the liquid storage device 30. As the air pressure outside the tank 31 is less than the air pressure inside the tank, the first water suction member 33 delivers the liquid in the tank 31 to the external device through the water guide pipe 32 by means of a wicking effect.

Optionally, a load block 3248 is disposed at the end, away from the water guide pipe 32, of the first water suction member 33, so that when the tank 31 is in a holding state, the end of the first water suction member 33 with the load block 3248 may move in the tank 31 to the position where the liquid is located in the tank 31. Thus, it is ensured that the first water suction member 33 can discharge the liquid.

With continued reference to FIGS. 15 and 16, at least one first through hole 321 is formed in the water guide pipe 32 at a position corresponding to the first water suction member 33, and a position, corresponding to the first through hole 321, of the first water suction member 33 is exposed to the first through hole 321. It may be understood that by forming the first through hole 321 in the water guide pipe 32, the liquid at the position where the water guide pipe 32 is located in the tank 31 may be in contact with the first water suction member 33. When there is little liquid stored in the tank 31, the liquid may be accumulated at the position where the water guide pipe 32 is located by reversing the tank 31 and then the liquid is sucked by the first water suction member 33 at the position where the through hole 321 is located, thereby improving the utilization rate of the liquid of the liquid storage device 30. Further, the position, corresponding to the first through hole 321, of the first water suction member 33 is exposed to be in contact with the liquid, a contact surface between the first water suction member 33 and the liquid is increased and the water suction area of the first water suction member 33 is increased. Thus, the suction and utilization rate of the liquid of the liquid storage device 30 is increased.

Optionally, the water guide pipe 32 is made of a flexible material, so that the water guide pipe 32 may be elastically deformed at the position of the first through hole 321, that is, the first through hole 321 may be deformed to increase the movement range of the first water suction member 33. The end, away from the water guide pipe 32, of the water suction member 33 may move to more positions in the tank 31 to suck the liquid, thereby increasing the utilization rate of the liquid in the tank 31.

Optionally, the first through hole 321 is in interference fit with the first water suction member 33 to maintain the sealing therebetween and thus prevent the failure of water suction due to air leakage of the first through hole 321.

With continued reference to FIG. 16, the first housing 311 includes a water injection hole 3111, a cover 3112, a barrier 3113, and a vent hole 3114. The water injection hole 3111 and the vent hole 3114 run through the first housing 311. The cover 3112 matches the water injection hole 3111 and covers the water injection hole 3111. The barrier 3113 runs through the first housing 311. The cover 3112 is configured to block the water injection hole 3111 during use. The water injection hole 3111 is configured for injection of the liquid into the tank 31. The vent hole 3114 is configured to keep the air pressure in the tank 31 balanced. The barrier 3113 is configured to block the vent hole 3114.

Specifically, a user may inject the liquid into the tank 31 through the water injection hole 3111 and the cover 3112 may seal the water injection hole 3111, so that the tank 31 filled with the liquid keeps a sealed state. The vent hole 3114 may keep the air pressure inside and outside the tank 31 balanced. The barrier 3113 may block the vent hole 3114 to prevent the liquid from leaking from the vent hole 3114.

Figure 17:
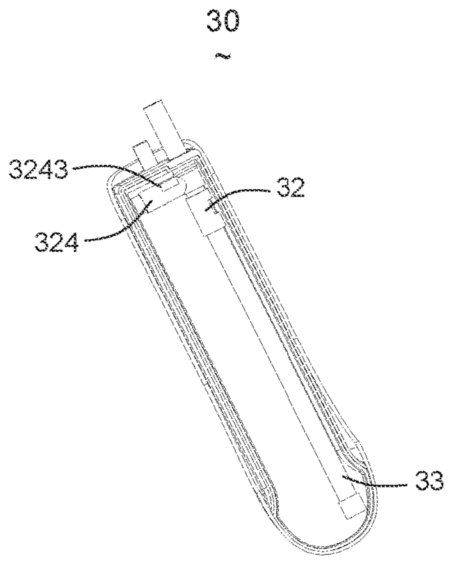
FIG. 17 is a structural diagram showing the connection of a second housing, a water guide pipe and a first water suction member of the liquid storage device according to the second embodiment of the present invention.

With reference to FIGS. 16 and 17, an auxiliary water suction assembly 324 is disposed on a side, close to the water outlet 3121, of the water guide pipe 32. The auxiliary water suction assembly 324 extends in a direction away from the water guide pipe 32 and is configured to suck the liquid, close to the water outlet 3121, in the tank 31.

Specifically, the auxiliary water suction assembly 324 is disposed at a position, close to the water outlet 3121, of the tank 31 to suck the liquid at the water outlet 3121 in the tank 31. It may be understood that when there is little liquid in the tank 31, the auxiliary water suction assembly 324 may normally provide the liquid while the first water suction member 33 of the liquid storage device 30 provides little liquid, thereby increasing the liquid utilization rate of the liquid storage device 30.

With continued reference to FIGS. 16 and 17, the auxiliary water suction assembly 324 includes an auxiliary water suction pipe 3241 and a second water suction member 3242. The auxiliary water suction pipe 3241 is disposed at one side of the water guide pipe 32 close to the water outlet 3121, extends towards the direction away from the water guide pipe 32 and is communicated with the water guide pipe 32. At least one second through hole 3243 is formed in the auxiliary water suction pipe 3241. The auxiliary water suction pipe 3241 is configured to deliver liquid sucked by the second water suction member 3242. The second water suction member 3242 is configured to suck the liquid close to the water outlet 3121 in the tank 31. The second through hole 3243 is configured to increase the contact surface between the second water suction member 3242 and the liquid.

Specifically, the second water suction pipe 3242 is embedded into the auxiliary water suction pipe 3241 and the length thereof is greater than that of the auxiliary water suction pipe 3241, so that one end of the second water suction member 3242 is exposed to the auxiliary water suction pipe 3241. One end of the auxiliary water suction pipe 3241 is connected to a pipe body of the water guide pipe 32 and the opposite end thereof extends towards the inner surface of the tank 31. The end, away from the water guide pipe 32, of the second water suction member 3242 sucks the liquid and delivers the liquid to the water guide pipe 32, so that the liquid at the position where the second water suction member 3242 is located away from the water outlet 3121 in the tank can be used. By forming the second through hole 3243 in the auxiliary water suction pipe 3241, the contact area of the second water suction member 3242 and the liquid is increased and the liquid at the position of the auxiliary water suction pipe 3241 in the tank 31 is sucked by the second water suction member 3242. Thus, the utilization rate of the liquid in the tank 31 is increased. Of course, the length of the second water suction member 3242 may be less than or equal to that of the auxiliary water suction pipe 3241, as long as the second water suction member 3242 can be placed in the auxiliary water suction pipe 3241 and suck water.

Optionally, the first water suction member 33 and the second water suction member 3242 may be a cotton stick or other materials having a wicking effect.

Optionally, the number of the second through holes 3243 may be one, two, three or more than three, as long as the second water suction member 3242 may pass through the second through hole 3243 to contact the liquid. In this embodiment, the number of the second through hole 3242 is one, but the number thereof is not limited in this embodiment.

Optionally, the auxiliary water suction pipe 3241 extends to the inner surface of the tank 31 to increase the utilization rate of the liquid in the tank 31.

Optionally, the water guile pipe 32 adopts the structure of a T-shaped three-way pipe. It may be understood that the auxiliary water suction pipe 3241 and the water guide pipe 32 are vertically disposed.

Optionally, the auxiliary water suction pipe 3241 and the wall surface of the end, close to the water outlet 3121, the tank 31 have the same size, which can increase the utilization rate of the liquid at a lower water level.

Figure 18:
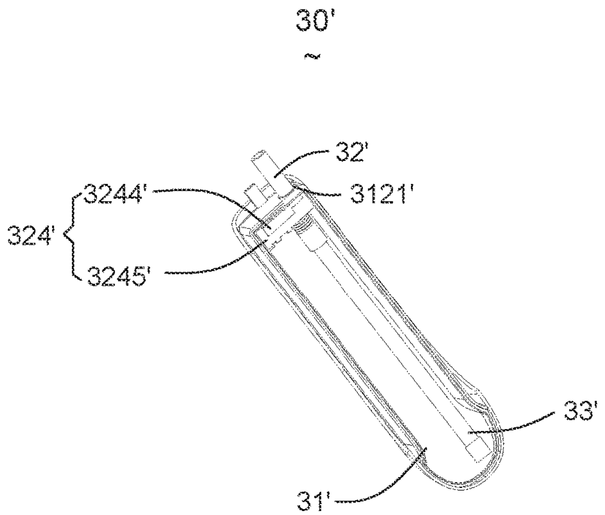
FIG. 18 is a structural diagram showing the connection of a second housing, a water guide pipe and a first water suction member of a liquid storage device according to a third embodiment of the present invention.
Figure 19:
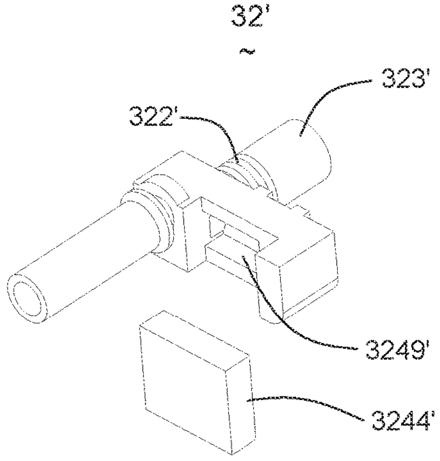
FIG. 19 is an exploded structural diagram of the water guide pipe of the liquid storage device according to the third embodiment of the present invention.

With reference to FIGS. 18 and 19, a third embodiment of the present invention provides a liquid storage device 30' that differs from the second embodiment in that an auxiliary water suction assembly 324' includes a water suction block 3244' and a drainage member 3245'. The water suction block 3244' is disposed on a side, close to the inner surface of a tank 31', of the drainage member 3245'. The drainage member 3245' is communicated with a water guide pipe 32'. The drainage member 3245' includes at least one drainage port 3249' communicated with the water guide pipe 32'. The water suction block 3244' is disposed on the drainage port 3249'. The water suction block 3244' is configured to suck the liquid in the tank 31' and discharge the liquid through the drainage member 3245'. The drainage member 3245' is configured to discharge the liquid close to a water outlet 3121' in the tank 31'.

Specifically, the drainage member 3245' defines a drainage port 3249' on the side close to the surface of the tank 31'. The water suction block 3244' is in contact with the inner surface of the tank 31' and is in interference connection with the drainage port 3249'. The water suction block 3244' sucks the liquid close to the water outlet 3121' in the tank 31' and discharges the liquid through the drainage member 3245', so that the liquid close to the water outlet 3121' in the tank 31' is sucked by the water suction block 3244', thereby increasing the utilization rate of the liquid in the tank 31'. Preferably, the water suction block 3244' may be any of water suction materials such as a cotton stick and sponge.

Optionally, the water guide pipe 32' includes a compression portion 122' and a connection portion 123'. The connection portion 123' is connected to one end of the first water suction member 33' and the compression portion 122' is compressible. The first water suction member 33' approaches the water guide pipe 32' by compressing the compression portion 122', so that the liquid, close to the water guide pipe 32', in the tank 31' is sucked by the first water suction member 33' and is delivered to an external device. Further, the first water suction member 33' compresses the compression portion 122' to move in the tank 31', thereby increasing the movement range of the first water suction member 33'.

Optionally, the number of the drainage ports 3249' may be one, two, three or more than three, as long as the water suction block 3244' may pass through the drainage port 3249' to contact the liquid. In this embodiment, the number of the drainage port 3249' is one, but the number thereof is not limited in this embodiment.

It may be understood that the water suction block 3244' is in interference fit with the drainage member 3245', so that a connection position of the water suction block 3244' and the drainage member 3245' is sealed, thereby avoiding the failure of pumping water due to loose connection and improving the stability of pumping water.

Figure 20:
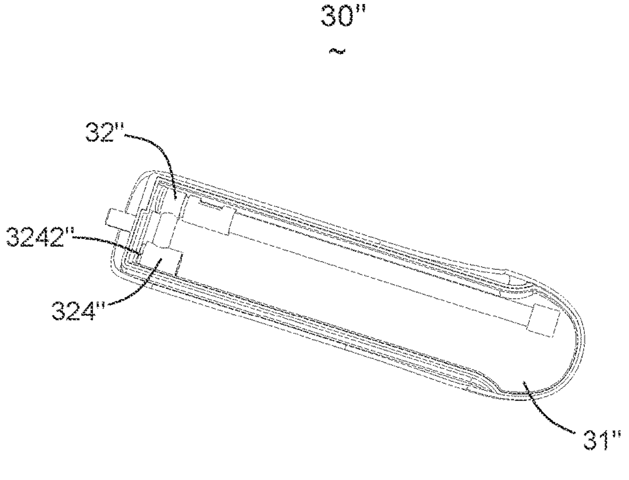
FIG. 20 is a structural diagram showing the connection of a second housing, a water guide pipe and a first water suction member of a liquid storage device according to a fourth embodiment of the present invention.
Figure 21:
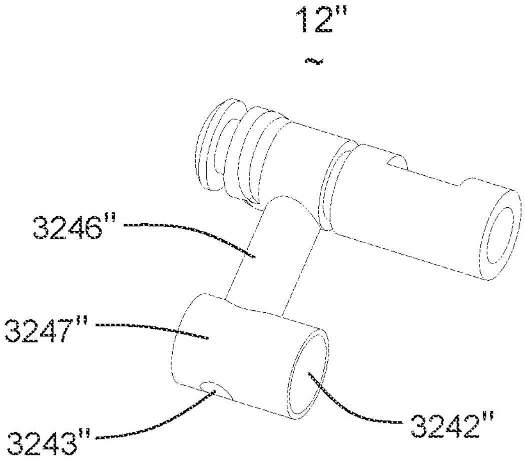
FIG. 21 is a structural diagram of the water guide pipe of the liquid storage device according to the fourth embodiment of the present invention.

With reference to FIGS. 20 and 21, a fourth embodiment of the present invention provides a liquid storage device 30" that differs from the second embodiment in that: an auxiliary water suction assembly 324" includes a water flow pipe 3246", a fixed pipe 3247" and a second water suction member 3242". The water flow pipe 3246" is positioned on a pipe body of the fixed pipe 3247", and a water guide pipe 32", the water flow pipe 3246" and the fixed pipe 3247" are sequentially disposed and communicated to form a structure of an H-shaped four-way pipe. The second water suction member 3242" is embedded into the fixed pipe 3247". At least one second through hole 3243" is formed in the fixed pipe 3247". Preferably, the second through hole 3243" is formed in the side, away from the water flow pipe 3246", of the fixed pipe 3247".

Specifically, two ends of the fixed pipe 3247" are open. The second water suction member 3242" is embedded into the fixed pipe 3247" and may be in contact with liquid through two ends exposed to the fixed pipe 3247". As such, the liquid at the position of the fixed pipe 3247" is further utilized. At the same time, the user may tilt the liquid in a tank 330" towards this position, so that the second water suction member 3242" may suck the liquid. Further, the second through hole 3243" is formed in the fixed pipe 3247" to increase the contact area between the second water suction member 3242" and the liquid, thereby increasing the utilization rate of the liquid.

It may be understood that the length of the second water suction member 3242" may be less than, greater than or equal to the length of the fixed pipe 3247", as long as the second water suction member 3242" is fixed in the fixed pipe 3247" and sucks water.

Optionally, the number of the second through holes 3243" may be one, two, three or more than three, as long as the second water suction member 3242" may pass through the second through hole 3243 to contact the liquid. In this embodiment, the number of the through hole 3242" is one, but the number thereof is not limited in this embodiment.

It may be understood that the fixed pipe 3247" is in interference fit with the second water suction member 3242", so that a connection position of the fixed pipe 3247" and the second water suction member 3242" is sealed, thereby avoiding the failure of pumping water due to loose connection and improving the stability of pumping water. The second through hole 3243" is in interference fit with the second water suction member 3242" to maintain the sealing therebetween and prevent the failure of water suction due to air leakage of the second through hole 3243".

Figure 22:
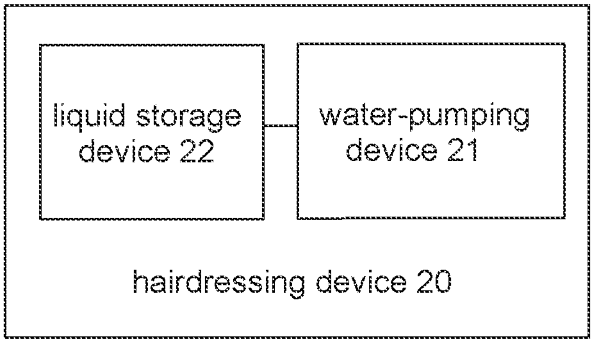
FIG. 22 is a structural diagram of a hairdressing device according to a fifth embodiment of the present invention.

With reference to FIG. 22, a fifth embodiment of the present invention provides a hairdressing device 20. The hairdressing device 20 may include the water-pumping device 21 and the liquid storage device 22 according to the present invention. The liquid storage device 22 is connected to the water-pumping device 21. The hairdressing device 20 may be configured to straighten hair, curl hair, dye hair and nourish hair, which is not specifically limited in the embodiment of the present invention. Specifically, the volume of the chamber p is 0.01-0.1 ml, the squeezing speed of the squeezing device to the chamber is 40-90 r/min and the water-pumping device 21 works at this volume and the squeezing speed, which can make the amount of liquid delivered from the water-pumping device 21 and the liquid delivery frequency suitable for the hairdressing device 20, without negatively affecting hairdressing of the hairdressing device 20 due to too little or too much liquid delivered.

It may be understood that when being used, the hairdressing device 20 usually needs to be held and used at many angles (for example, a portable steam hair straightener needs to be lifted to meet the requirements of straightening hair at various angles). As a result, the liquid storage device 22 in the device also needs to change the angle, and the liquid in the liquid storage device 22 will move to different positions. When the liquid moves close to the water outlet, the liquid may be continued to be sucked through the liquid storage device 22. Thus, the utilization rate of the liquid is increased and the failure of water suction due to liquid inversion is avoided.

Figure 23:
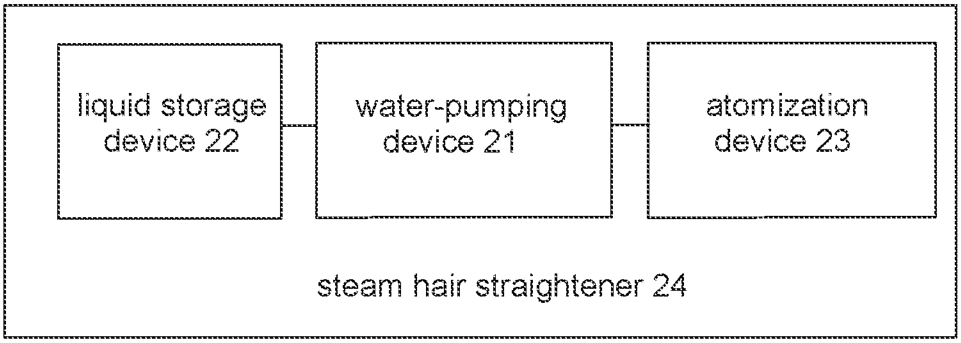
FIG. 23 is a structural diagram of a steam hair straightener deformed from the hairdressing device according to the fifth embodiment of the present invention.

As an embodiment, FIG. 23 shows a steam hair straightener 24 as a variant of the hairdressing device 20. The steam hair straightener 24 includes an atomization device 23. Liquid delivered from the second water delivery pipe of the water-pumping device 21 passes through the atomization device 23 to form steam.

The water-pumping device and the hairdressing device provided by the embodiments of the present invention have been described in detail above. Specific examples are used herein to explain the principles and implementation modes of the present invention. The descriptions of the above embodiments are only configured to help understand the method and the core concept of the present invention. Meanwhile, for a person of ordinary skill in the art, there will be changes in the specific implementation mode and the application scope according to the concept of the present invention. In summary, the content of the description should not be understood as a limitation to the present invention. Any modifications, equivalent replacements, improvements and the like made within the principles of the present invention should be included within the scope of protection of the present invention.

The invention claimed is:

1. A hairdressing device comprising:

a water-pumping device and a liquid storage device, wherein the water-pumping device is connected to the liquid storage device; the water-pumping device comprises a chamber for containing a liquid and a squeezing device;

two opposite ends of the chamber are communicated with a first water delivery channel and a second water delivery channel respectively; the first water delivery channel is connected to the liquid storage device; a wall surface of the chamber is at least partially made of a deformable material, and the squeezing device periodically squeezes a deformable wall surface from one end of the chamber to the other end thereof to make cause the first water delivery channel to pump water and the second water delivery channel to deliver water; the water-pumping device comprises a flexible pump core, an outer bracket and a baffle;

wherein the outer bracket sleeving the flexible pump core; the baffle is disposed between the flexible pump core and the outer bracket;

the baffle extends from one of the flexible pump core and the outer bracket and is positioned on the other of the flexible pump core and the outer bracket; wherein the flexible pump core is entirely made of the a deformable material.

2. The hairdressing device according to claim 1, wherein the chamber is defined by a hard wall surface and the deformable wall surface; and there is no hose structure between the first water delivery channel and the second water delivery channel.

3. The hairdressing device according to claim 1, wherein the water-pumping device further comprises an upper cover with a first convex member and a lower cover with a second convex member; the flexible pump core is provided with a first concave member and a second concave member; the first convex member of the upper cover matches the first concave member of the flexible pump core in structure and the second convex member of the lower cover matches the second concave member of the flexible pump core in structure;

when the upper cover of the water-pumping device is connected to the outer bracket, the first convex member of the upper cover squeezes the first concave member of the flexible pump core, so that the first concave member is tightly attached to the outer bracket; and when the lower cover is connected to the outer bracket, the second convex member squeezes the second concave member, so that the second concave member is tightly attached to the outer bracket.

4. The hairdressing device according to claim 1, wherein the water-pumping device further comprises an inner bracket that is fixed inside to the flexible pump core;

the squeezing device drives the inner bracket to periodically squeeze the flexible pump core from one end of the chamber to the other end thereof to cause the first water delivery channel to pump water and the second water delivery channel to deliver water.

5. The hairdressing device according to claim 1, wherein the squeezing device comprises an eccentric wheel; and the chamber is ring-shaped with an opening.

6. The hairdressing device according to claim 5, wherein the squeezing device further comprises a swing bearing disposed on the eccentric wheel and tightly attached to the deformable wall surface; and when moving, the eccentric wheel drives the swing bearing to periodically squeeze the deformable wall surface from one end of the chamber to the other end thereof to cause the first water delivery channel to pump water and the second water delivery channel to deliver water.

7. The hairdressing device according to claim 1, wherein the flexible pump core is ring-shaped; the outer bracket is ring-shaped with a notch; the baffle is fixed to the flexible pump core; and an end of the baffle, that is disposed away from the flexible pump core is clamped into the notch.

8. The hairdressing device according to claim 1, wherein the baffle is made of a deformable material, and a thickness of one side of the baffle that is close to the flexible pump core, is less than that of another side of the baffle that is away from the flexible pump core.

9. The hairdressing device according to claim 3, wherein a first water delivery pipe is disposed on the upper cover, and a second water delivery pipe is disposed on the lower cover; the flexible pump core is provided with water delivery holes that are respectively corresponding to the first water delivery channel and the second water delivery channel;

a first groove and a first boss that match each other are disposed on surfaces, which are facing each other, and disposed on the outer bracket and the upper cover, respectively; a second groove and a second boss that match each other are disposed on surfaces, which are facing each other and disposed on the outer bracket and the lower cover;

when the first boss is inserted into the first groove, the first water delivery pipe is correspondingly communicated with the first water delivery channel through the water delivery hole; and when the second boss is inserted into the second groove, the second water delivery pipe is correspondingly communicated with the second water delivery channel through the water delivery hole.

10. The hairdressing device according to claim 1, wherein the liquid storage device comprises a water tank, a water guide pipe, and a first water suction member; one end of the water guide pipe passes through the water tank to be communicated with ambiance, and the opposite end thereof is connected to the first water suction member; one end of the first water suction member is disposed on the water guide pipe and the opposite end thereof extends into the water tank.

11. The hairdressing device according to claim 10, wherein the water guide pipe defines at least one first through hole at a position that is corresponding to the first water suction member, and a position of the water suction member that is corresponding to the at least one first through hole, is exposed to the at least one first through hole.

* * * * *